H. A. SÉVIGNÉ.
LOCK NUT.
APPLICATION FILED FEB. 6, 1920.
1,352,765.
Patented Sept. 14, 1920.
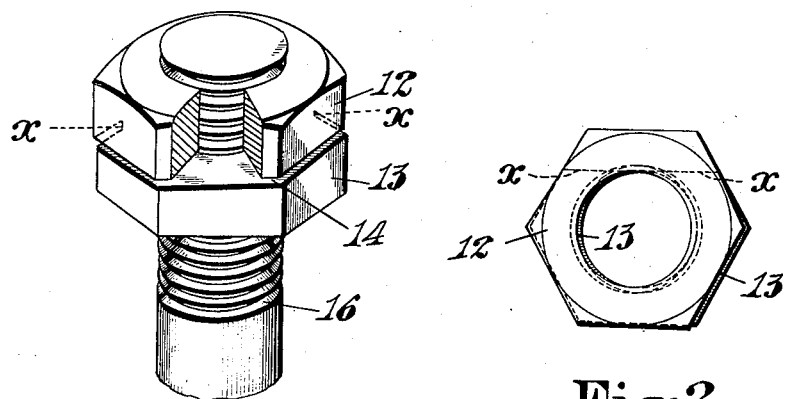
Fig.1.
Fig.2.
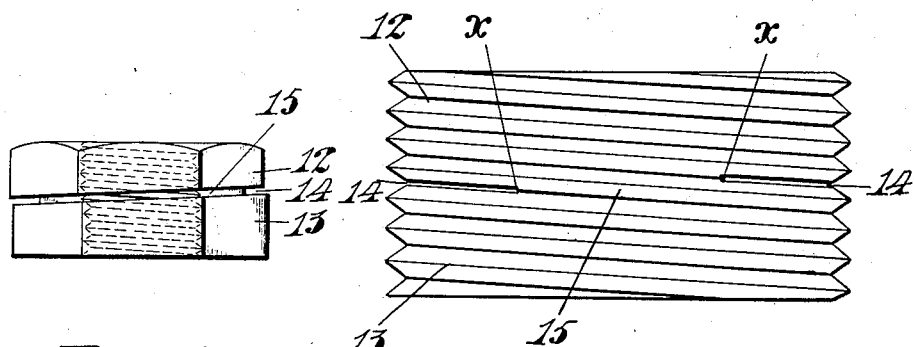
Fig.3.
Fig.4.
INVENTOR.
HENRI A. SÉVIGNÉ.
BY *O. W. Harrison*
ATTY.

UNITED STATES PATENT OFFICE.

HENRI ALFRED SÉVIGNÉ, OF WINTHROP, MASSACHUSETTS.

LOCK-NUT.

1,352,765.  Specification of Letters Patent.  Patented Sept. 14, 1920.

Application filed February 6, 1920. Serial No. 356,612.

*To all whom it may concern:*

Be it known that I, HENRI A. SÉVIGNÉ, a citizen of the United States, and resident of Winthrop, in the county of Suffolk and State of Massachusetts, have invented certain new and useful Improvements in Lock-Nuts, of which the following is a specification.

This invention relates to internally threaded devices known as nuts, which coöperate with externally threaded members such as bolts, shafts and axles to secure or retain the different parts of machines and appliances in proper relative positions.

Although many novel forms of nuts have been devised which were intended to remain independently of other supplemental devices, practically immovable relatively to the externally threaded members to which they were applied, it is nevertheless a fact that in the majority of machines and appliances at the present day the preferable way of holding a nut in its adjusted position is to supply a supplemental device such as a jam nut or a spring washer. Even with these supplemental devices, or when the nuts are set tightly against collars or shouldered members, vibrations or the rotation of adjacent parts of the machine cause the nuts to work loose and fall. For instance any road traversed by automobiles and motor trucks will disclose nuts which have dropped from passing machines.

Besides the possibility of failure of a jam nut to hold the parts securely is the objection that the setting of the main nut and the jam nut requires two operations. And even then a fine accurate setting is difficult if not impossible because, if the main nut is set just right, the forcing of the jam nut against it changes that setting slightly. The two, together, can never be set firmly. Hence a final operation of the jam nut alone is necessary.

The object of my invention is to provide a single nut which, when moved to any point along the coacting male screw, will remain there, whether set in contact with some other member or not, and which can not be dislodged from its set position without employing a tool and a very considerable amount of tool-actuating force.

With this object in view, my invention consists in the nut substantially as hereinafter described and claimed.

Of the accompanying drawings:

Figure 1 is a perspective view, partly broken out, of a nut constructed according to my invention and illustrated as mounted on a threaded male member.

Fig. 2 is a plan view of the nut.

Fig. 3 is an elevation looking from that side which is lowest in Fig. 2, the slit or line of division being shown as formed in a plane inclined relatively to the base of the nut, and Fig. 4 is a development of the threaded wall of the nut, the slit or line of division being illustrated as coinciding, its entire length, with the bottom of a thread part way around the nut, said slit, however, being of less extent than in the other figures.

The nut which may be of any size and external shape, is partially divided transversely by a slot 14 to present outer and inner portions, 12, 13, connected by an integral portion 15, the nut being illustrated in Fig. 1 as mounted on a portion of a male member 16 such as a bolt. The terms "inner" and "outer" are merely relative terms employed to facilitate description.

As best shown in Fig. 3 the slot or slit 14 is not in a plane parallel with the plane of the base of the nut, but is in an inclined plane. In practice the slot is so formed as to follow as closely as possible the spiral form of one of the threads of the nut, the slot extending more than half way through the nut but not far enough to completely divide the threaded interior of the nut. The slot may extend to the line indicated at $x$ $x$ in Fig. 2, or not quite so far. As indicated in the development view, Fig. 4, the slot 14 may be spiral and so located as to intersect the inner wall of the nut between the threads, without crossing any thread. In other words, the slot communicates with the bottom of one spiral groove part way around the nut, but is only of such length or depth that, even when formed by a saw operating in a uniform plane, it does not cut across the top of any thread. The result is that throughout the entire length of the almost circular slit the side faces of the two threads each side of the slit present beveled faces which converge toward the slit so as to coact with the thread of the male member, which is between those two nut threads. Obviously therefore anything which tends to contract or spread the slot 14 effects more or less of a friction grip on that thread of the male member which is engaged by the two threads of the nut at opposite sides of the slot. And since the slot is not of such length as to cross the apex of any thread, such friction grip is continuous, and there is no severed apex of a thread to present a sharp point that would tend to cut into and wear the thread of the male member.

After the nut is transversely cut as at 14, the two portions 12, 13 are slightly altered as to their relative positions, as by off-setting one laterally to the other. The amount of such off-setting is exaggerated in the drawings to render it visible therein.

A single nut of the character illustrated can be moved by a wrench to any point longitudinally of a male member with great accuracy in places so difficult of access as to render it practically impossible to properly set a nut and a jam nut. This is because it will remain in the position to which it is moved, without setting it up against anything or employing a secondary nut to jam it.

Owing to the fact that the inner and outer portions are relatively offset laterally, any tool employed for turning the nut onto or along the member 16 tends to bring those portions into alinement and therefore reduces the frictional binding of the threads. Upon removal of the tool there is such frictional grip upon the member 16 as to successfully resist any loosening whatever from the set position except upon the application of force applied externally to the nut. I have found in practice that a slight lateral offset in the proper direction results in requiring more force to remove the nut than to apply it.

Having now described my invention, I claim:—

1. A nut having a slot which partially divides it transversely, said slot substantially conforming to one of the threads of the nut and the ends of the slot terminating at points to leave the apex of one thread crossing the space between said ends.

2. A nut having all of its threads continuous, said nut being partially divided transversely and having its inner and outer portions relatively offset laterally.

3. A nut partially divided on a line substantially conforming to one of its threads, the line of division terminating at a point to leave all threads continuous, the portion of the nut at one side of the line of division being laterally offset relatively to the portion at the other side of said line.

In testimony whereof I have affixed my signature.

HENRI ALFRED SÉVIGNÉ.

Witnesses:
ROLF D. WEEKS,
ELLA G. FITZGERALD.